(12) United States Patent
Chien et al.

(10) Patent No.: US 12,363,811 B2
(45) Date of Patent: Jul. 15, 2025

(54) DETECTION AND ILLUMINATION OF DARK ZONES VIA COLLABORATIVE LIGHTING

(71) Applicant: SimpliSafe, Inc., Boston, MA (US)

(72) Inventors: Ginger Chien, Bellevue, WA (US); Zhi Cui, Sugar Hill, GA (US); Eric Zavesky, Austin, TX (US); Robert T. Moton, Jr., Alpharetta, GA (US); Adrianne Binh Luu, Atlanta, GA (US); Robert Koch, Peachtree Corners, GA (US)

(73) Assignee: SimpliSafe, Inc., Boston, MA (US)

( * ) Notice: Subject to any disclaimer, the term of this patent is extended or adjusted under 35 U.S.C. 154(b) by 0 days.

(21) Appl. No.: 18/649,987

(22) Filed: Apr. 29, 2024

(65) Prior Publication Data

US 2024/0284571 A1    Aug. 22, 2024

Related U.S. Application Data

(63) Continuation of application No. 18/161,874, filed on Jan. 30, 2023, now Pat. No. 11,974,375, which is a continuation of application No. 17/500,316, filed on Oct. 13, 2021, now Pat. No. 11,570,869.

(51) Int. Cl.
  *H05B 47/10* (2020.01)
  *H05B 47/11* (2020.01)
  *H05B 47/19* (2020.01)
  *H04L 67/12* (2022.01)

(52) U.S. Cl.
  CPC ............. *H05B 47/11* (2020.01); *H05B 47/19* (2020.01); *H04L 67/12* (2013.01)

(58) Field of Classification Search
  CPC ........ H05B 47/10; H05B 47/11; H05B 47/19; H05B 45/10; H04L 67/12
  See application file for complete search history.

(56) References Cited

U.S. PATENT DOCUMENTS

| 11,570,869 B1 | 1/2023 | Chien |
| 2019/0253670 A1 | 8/2019 | Chien |
| 2021/0112647 A1* | 4/2021 | Coleman ................. G01S 17/42 |

FOREIGN PATENT DOCUMENTS

CN    109712159 A  *  5/2019

OTHER PUBLICATIONS

LIDAR 101: An Introduction to Lidar Technology Data, and Applications, National Oceanic and Atmospheric Administration (NOAA), Nov. 2012, 76 pages.

Topouzelis, K., et al., "Dark formation detection using neural networks", International Journal of Remote Sensing, vol. 29, Issue 16, 2008, 6 pages.

* cited by examiner

*Primary Examiner* — Jimmy T Vu
(74) *Attorney, Agent, or Firm* — Pierce Atwood LLP

(57) ABSTRACT

A processing system including at least one processor may detect at least one dark zone in a vicinity of a user, determine at least one lighting feature for an illumination of the at least one dark zone in accordance with a user profile of the user, identify at least one light source to provide the illumination of the at least one dark area in accordance with the at least one lighting feature that is determined, and transmit an instruction to the at least one light source to provide the illumination of the at least one dark zone in accordance with the at least one lighting feature that is determined.

20 Claims, 3 Drawing Sheets

DETECTION AND ILLUMINATION OF DARK ZONES VIA COLLABORATIVE LIGHTING

This application is a continuation of U.S. patent application Ser. No. 18/161,874, filed on Jan. 30, 2023, now U.S. Pat. No. 11,974,375, which is a continuation of U.S. patent application Ser. No. 17/500,316, filed on Oct. 13, 2021, now U.S. Pat. No. 11,570,869, both of which are herein incorporated by reference in their entirety.

The present disclosure relates to network-based transportation management, and more particularly to methods, computer-readable media, and apparatuses for identifying and instructing at least one light source to provide illumination of at least one dark zone in accordance with at least one lighting feature that is determined based on a user profile.

BACKGROUND

Current trends in wireless technology are leading towards a future where virtually any object can be network-enabled and addressable on-network. The pervasive presence of cellular and non-cellular wireless networks, including fixed, ad-hoc, and/or or peer-to-peer wireless networks, satellite networks, and the like along with the migration to a 128-bit IPv6-based address space provides the tools and resources for the paradigm of the Internet of Things (IoT) to become a reality. In addition, autonomous vehicles are increasingly being utilized for a variety of commercial and other useful tasks, such as package deliveries, search and rescue, mapping, surveying, and so forth, enabled at least in part by these wireless communication technologies.

SUMMARY

In one example, the present disclosure describes a method, computer-readable medium, and apparatus for identifying and instructing at least one light source to provide illumination of at least one dark zone in accordance with at least one lighting feature that is determined based on a user profile. For instance, a processing system including at least one processor may detect at least one dark zone in a vicinity of a user, determine at least one lighting feature for an illumination of the at least one dark zone in accordance with a user profile of the user, identify at least one light source to provide the illumination of the at least one dark area in accordance with the at least one lighting feature that is determined, and transmit an instruction to the at least one light source to provide the illumination of the at least one dark zone in accordance with the at least one lighting feature that is determined.

BRIEF DESCRIPTION OF THE DRAWINGS

The teachings of the present disclosure can be readily understood by considering the following detailed description in conjunction with the accompanying drawings, in which.

To facilitate understanding, identical reference numerals have been used, where possible, to designate identical elements that are common to the figures.

DETAILED DESCRIPTION

Figure 1:
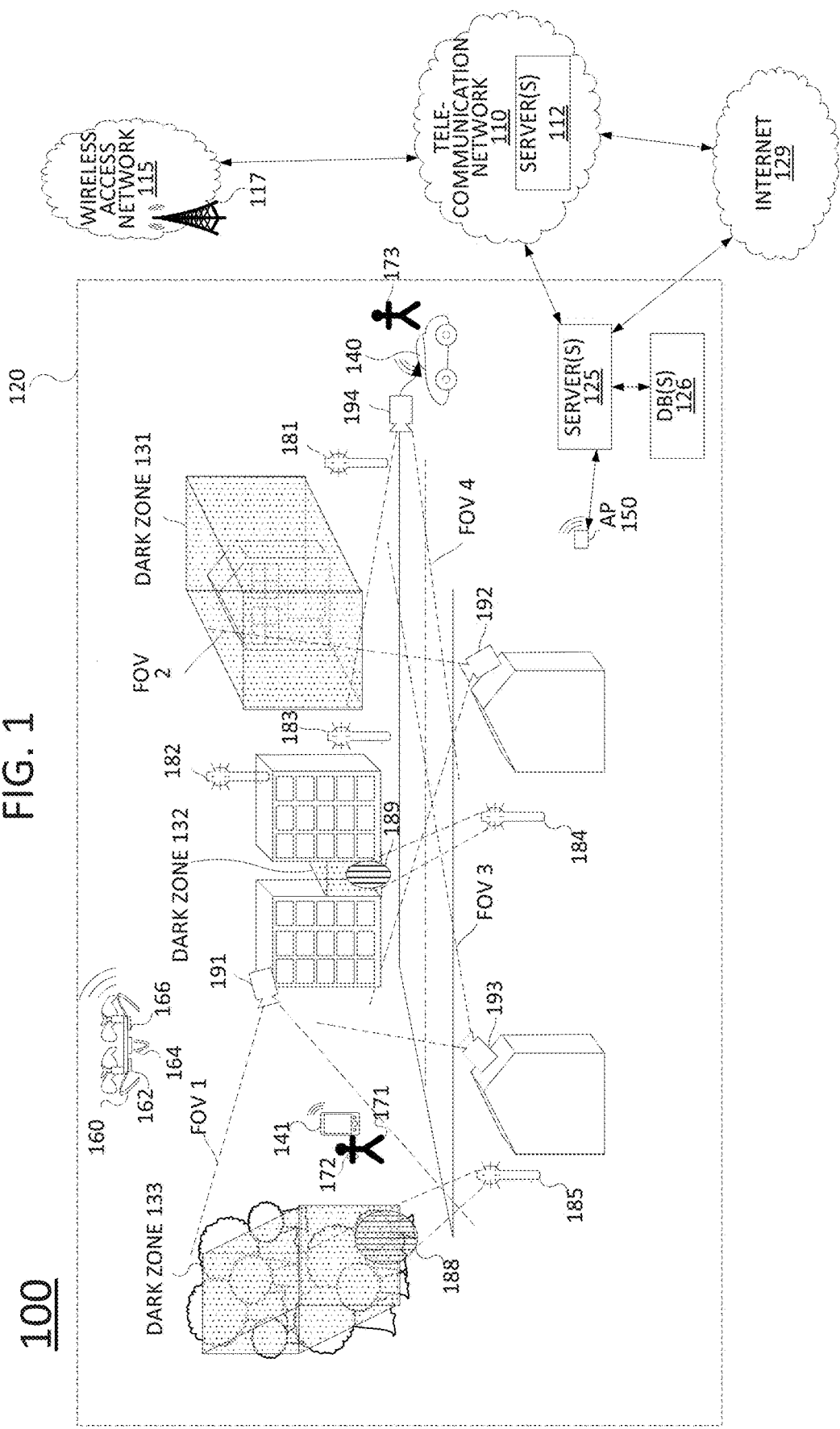
FIG. 1 illustrates an example system related to the present disclosure.

The present disclosure broadly discloses methods, non-transitory (i.e., tangible or physical) computer-readable media, and apparatuses for identifying and instructing at least one light source to provide illumination of at least one dark zone in accordance with at least one lighting feature that is determined based on a user profile. In particular, examples of the present disclosure provide improved lighting of an area that experiences transient conditions. The transient conditions may produce the need or desire for lighting to be provided in response to the occurrence of an event and for a period of time that is of the duration of the event. For example, an event may be defined as (1) the presence of an entity at a location and time—such as a person or animal; or a thing—such as a car or other electronically-equipped devices. It may also be (2) the predicted future presence of the entity or thing at a location and time. It may also be (3) the detection of a dark area at a location and time.

A plurality of light sources (e.g., "smart lights") may be connected to a controller (e.g., a processing system, or computing system) via one or more networks. In one example, each light source may have an associated profile, which may be stored in a lighting database that is part of, or that is accessible to the controller. The controller may also be in communication with other sensors for detecting the occurrence of events, which are recorded in an event database, and which may result in lighting requests being made to available and relevant light sources.

The lighting database may be designated for an area, such as a neighborhood, a city, or other geographically defined areas. The presence of a profile for a light source in the lighting database is an indication of the availability of the light source for collaborative lighting applications. A light source profile may include at least one unique identifier (ID), such as an Internet Protocol (IP) address, a serial number, or the like, and other values indicating the capabilities of the light source. For instance, the current intensity, coverage area, the range of intensities available, the color(s) and/or temperature(s) available, and the range of potential coverage area of the light source may be included. Thus, it should be noted that some characteristics may have more than one value, or a range of values. For example, a dimmable light source may have variable intensity. Also, if a light source is capable of more than one color of light, this may be stored in the profile. The current coverage may be an indication of the area across which an effective level of light is transmitted. The coverage range may indicate the area across which the light source can effectively illuminate, with directional or intensity adjustments. These areas may, for instance, be indicated by a range of geographic coordinates, or the relative angular coordinates in conjunction with the location of the light source. In this regard, the profile entry for the light source may also indicate the geographic coordinates of the location of the light source itself. This collection of profile data provides an available inventory of light sources that may be identified and instructed by the controller to provide illumination of dark zones in accordance with lighting features that may be determined based on user profiles.

In one example, there may also be one or more transient light sources within the geographic area, that will be within the area, or that can be summoned to the area. These transient light sources may also have profile entries in the lighting database. For instance, an autonomous vehicle (AV) (such as an autonomous aerial vehicle (AAV) or a surface-based AV) may register its location and its duration of time expected within the area with the controller. For instance, the AV may send profile features (e.g., the capabilities of the AV, and in particular, the light source features of the AV) to the controller, which may then register the AV as a light source in the lighting database. When the AV leaves the area managed by the controller, the controller may be notified by the AV of the departure. The controller may then unregister the AV from the lighting database, or may indicate the AV is an "inactive" light source that is unavailable for selection.

In one example, one or more cameras may be operative in the managed area and may be in communication with and/or accessible to the controller. For instance, the cameras may have on-board image or video analytics capabilities, or may stream video and/or images to the controller, which may provide similar analysis (e.g., to identify individuals, items, dark zones, etc., as described in greater detail below). Information regarding the cameras may be stored in a camera/sensor database, such as camera locations (which in one example may include heights above or below grade/ground), orientations, fields-of-view (e.g., viewport size), resolutions, ranges, etc., as well as the maximum ranges/values for any or all of such features which may be adjustable/configurable for a particular camera. For instance, a camera may have remotely adjustable/configurable pan and tilt settings (e.g., which may cover 360 degrees or a lesser number of degrees in azimuth, and −90 to +90 degrees in elevation, or a lesser amount, etc.), zoom settings, and so forth. The cameras may be location-aware and/or aware of their respective fields-of-view at any given time. Alternatively, or in addition, fixed locations of one or more of the cameras may be known to the controller. In one example, the cameras may have adjustable orientations. In addition, there may also be transient cameras, such as AV-mounted cameras, dashboard cameras (dashcams), head-mounted cameras (e.g., an outward facing camera of an augmented reality (AR) headset), or the like that may be within the area, and which may be registered in the camera/sensor database and accessible to the controller. In one example, video and/or images from one or more of the cameras may be analyzed either at the camera(s), or by the controller to detect dark zones, or dark areas. Since either or both of the camera(s) or the controller may be aware of camera location(s) and orientation(s), geographic coordinates or other location makers may be identified for detected dark zones.

Once the location makers of one or more dark areas are determined, the controller may search the lighting database for any light sources that are available and that have a potential coverage that includes all or a portion of the dark zone(s). Upon detecting one or more light sources that may be selected to illuminate all or a part of the dark zone(s), the controller may send one or more instructions to the light source(s) to be activated accordingly. The instructions may include, for a particular light source, a level of intensity, a light color and/or temperature, an orientation, a beam spread, and other values. In one example, the instructions may include geographic coordinates, e.g., a range for the light to cover—this may be the entire area needing illumination, or just a portion—if another light source will cover the remainder. For instance, in one example, a light source may comprise logic to understand how to orient directionally to fulfill the request. Alternatively, the orientation instructions may come from the controller. In other words, the light source is not necessarily informed of the location and bounds of the dark zone; it may simply comply with the lighting features as indicated in the instructions. In one example, the controller may update the lighting database to indicate that a light source is currently employed in fulfilling a collaborative lighting request. In addition, the light source may declare itself to be unavailable for any new requests to provide illumination (such as an AV indicating to a different controller managing another area that the AV has been engaged in a task).

In another embodiment, one or more detection sensors, such as a motion sensor, camera, microphone, heat sensor, or other sensor(s) may be used to detect the location of an object. The object may be in motion or stationary. The object may also detect its own location, such as via a Global Positioning System (GPS) unit, which may be communicated to the controller. For instance, the object may be a person, a vehicle, an animal, or other items/objects. In one example, the illumination of dark zones may be activated in response to the determination of the presence of an object, e.g., a person or vehicle. For instance, although dark zones may be detected, if there are no persons present, then there may be no need or desire to illuminate these dark zones. However, if a person is present (e.g., either on-foot, riding in a vehicle, riding a bicycle or scooter, etc.), then the illumination of one or more dark zones may be activated in accordance with conditions in a user profile of the user that may be stored in a user database and/or that may be conveyed to the controller as the user enters the area managed by the controller.

For example, if a device of a specific person is detected, the device associated with the person may not only send its GPS location to the controller, but it may also specify a lighting preference for the user. Alternatively, the controller may identify the user and may retrieve a user profile from a user database. For instance, if the user has poor vision or is nervous walking at night, the user's preference may call for brighter conditions, which may be taken into account when the controller searches for available light sources in the area, and which may be conveyed in the instruction(s) to any light source(s) that is/are selected. As another example, if the user is going for a leisurely walk, the user may prefer a softer lighting. In still another example, a user may have trouble perceiving certain colors and may prefer that any activated lighting be of a particular color (or any color others than one or more colors that are objectionable to the user).

In a similar manner, the future location of a user may be predicted, for instance, using a current location, speed, and a planned route (e.g., as determined from a mobile computing device, such as the user's smartphone, and/or a vehicle of the user). Furthermore, a user driving or riding in a vehicle may have specific vision preferences or requirements, such as noted above, e.g., light of a particular color, intensity, etc., light having certain directionality characteristics, e.g., not pointed directly at the vehicle so as to create glare for the user, but providing indirect lighting of one or more dark zones, etc. If the vehicle is traveling at a fast speed, the range of dark zone(s) to be illuminated may be defined to be a further distance in advance of the vehicle than if the vehicle is proceeding at a slower speed. It should be noted that any network-connected light sources may be made available to the controller, such as house lights being registered with the controller by or on behalf of the homeowners for use by the controller. In one example, the present disclosure may be used to illuminate an event at a venue, such as a theatrical, concert, or sporting event, e.g., in accordance with one or more user preferences, such as a consensus for lighting preferences in accordance with multiple user profiles.

In one example, personal device(s) of a user, e.g., a cellular telephone, a wearable computing device, etc., may provide location information and in one example, additional context information, such as video, images, or audio recordings of a surrounding environment, biometric information of the user, and so forth. In another example, personal device(s) of an animate being (e.g., a pet, a service animal, etc.), such as a smart collar with communication capabilities, a GPS unit, and so forth may provide location information and in one example, additional context information, such as video, images, or audio recordings of a surrounding environment, biometric information, and so forth. The present disclosure will use a human user as an example of the broader term "animate being" in explaining various embodiments below. However, it should not be interpreted that such embodiments are only limited to a human user, but instead, be interpreted to encompass any other animate beings that are registered with the controller for obtaining lighting assistance in accordance with a "user profile." In addition, some vehicles (e.g., self-driving or semi-autonomous vehicles) may be equipped with advanced sensors (e.g., LiDAR (light detection and ranging)) for detecting lanes, curbs, traffic lights, other vehicles, pedestrians, etc. Thus, a "camera" may include a LiDAR sensor and/or a camera with LiDAR capabilities. In one example, cameras may include traffic cameras, door cameras (e.g., with opt-in and registration by a homeowner to participate), and may be always-on, motion-activated, or may be configured to periodically capture still images (e.g., as an alternative or in addition to video). In one example, additional sensors/sensor devices may be used to gain additional contextual information, such as overhead or in-road traffic sensors, wireless sensors (e.g., radio frequency identification (RFID) sensors, Bluetooth beacons, Wi-Fi direct sensors, etc.), which may be used to detect locations, speeds, directions of movement, etc. with respect to user, vehicles, or other items/objects. These and other aspects of the present disclosure are discussed in greater detail below in connection with the examples of FIGS. 1-3.

To aid in understanding the present disclosure, FIG. 1 illustrates an example system 100, related to the present disclosure. As shown in FIG. 1, the system 100 connects a mobile device 141, biometric sensor 172, vehicle 140 (including camera 194, e.g., a dashcam), autonomous aerial vehicle (AAV) 160 (including a camera 162), server(s) 112, server(s) 125, DB(s) 126, access point 150, cameras 191-193, and light sources 181-185, with one another and with various other devices via a core network, e.g., a telecommunication network 110, a wireless access network 115 (e.g., a cellular network), and Internet 129. In the example of FIG. 1, cameras 191-193 and light sources 181-185 may be registered to participate in a collaborative lighting service in an area 120, e.g., managed and/or provided by server(s) 125. In one example, access point (AP) 150 associated with server(s) 125 may establish a wireless local area network (WLAN), e.g., an Institute for Electrical and Electronics Engineers (IEEE) 802.11 network (e.g., a Wi-Fi network), an IEEE 802.15, e.g., a Bluetooth network, a ZigBee network, and so forth, a mesh network comprising a combination of interconnected devices using a plurality of such communication modalities and protocols, or the like. Accordingly, in one example, the cameras 191-193, light sources 181-185, mobile device 141, biometric sensor 172, vehicle 140 and/or camera 194, AAV 160, and so forth may communicate with server(s) 125 via AP 150.

The access point 150 may comprise an IEEE 802.11 (Wi-Fi) router, an IEEE 802.15 access point (e.g., a "Bluetooth" access point, a "ZigBee" access point, etc.), and so forth. In one example, AP 150 may provide a dedicated short range communication (DSRC) network. For example, a DSRC network may be operated by a governmental entity or a private entity managing area 120. In general, DSRC networks enable wireless vehicle-to-vehicle (V2V) communications and vehicle-to-infrastructure (V2I) communications. It should also be noted that although only one access point 150 is illustrated in FIG. 1, in other, further, and different examples, additional access points may be deployed within the area 120 to provide additional WLAN, Wi-Fi, or other wireless network coverages to the various participating devices (e.g., the cameras 191-193, light sources 181-185, mobile device 141, biometric sensor 172, vehicle 140 and/or camera 194, AAV 160, etc.). In accordance with the present disclosure, AAV 160 may include a camera 162 and one or more radio frequency (RF) transceivers 166 for cellular communications and/or for non-cellular wireless communications. In one example, AAV 160 may also include one or more module(s) 164 with one or more additional controllable components, such as one or more infrared, ultraviolet, and/or visible spectrum light sources, a light detection and ranging (LiDAR) unit, and so forth.

In one example, at least some of the cameras 191-193 and light sources 181-185 may be in communication with or otherwise accessible to server(s) 125 via one or more wired networks, e.g., via respective home or business network connections via one or more Internet service provider (ISP) networks. Similarly, in one example, the area 120 may further include a Local Area Network (LAN), e.g., an Ethernet network. For instance, the area 120 may include a university campus, a corporate campus, a planned community, etc., which may have a wired LAN to which at least some participating devices may be connected (e.g., cameras 191-193 and light sources 181-185). It should be noted, however, that these participating devices may still be deployed and owned by respective property owners, tenants, managers, etc. and voluntarily registered to participate in a collaborative lighting service provided via server(s) 125. For ease of illustration, not all of the possible wired connections are shown in FIG. 1.

Figure 3:
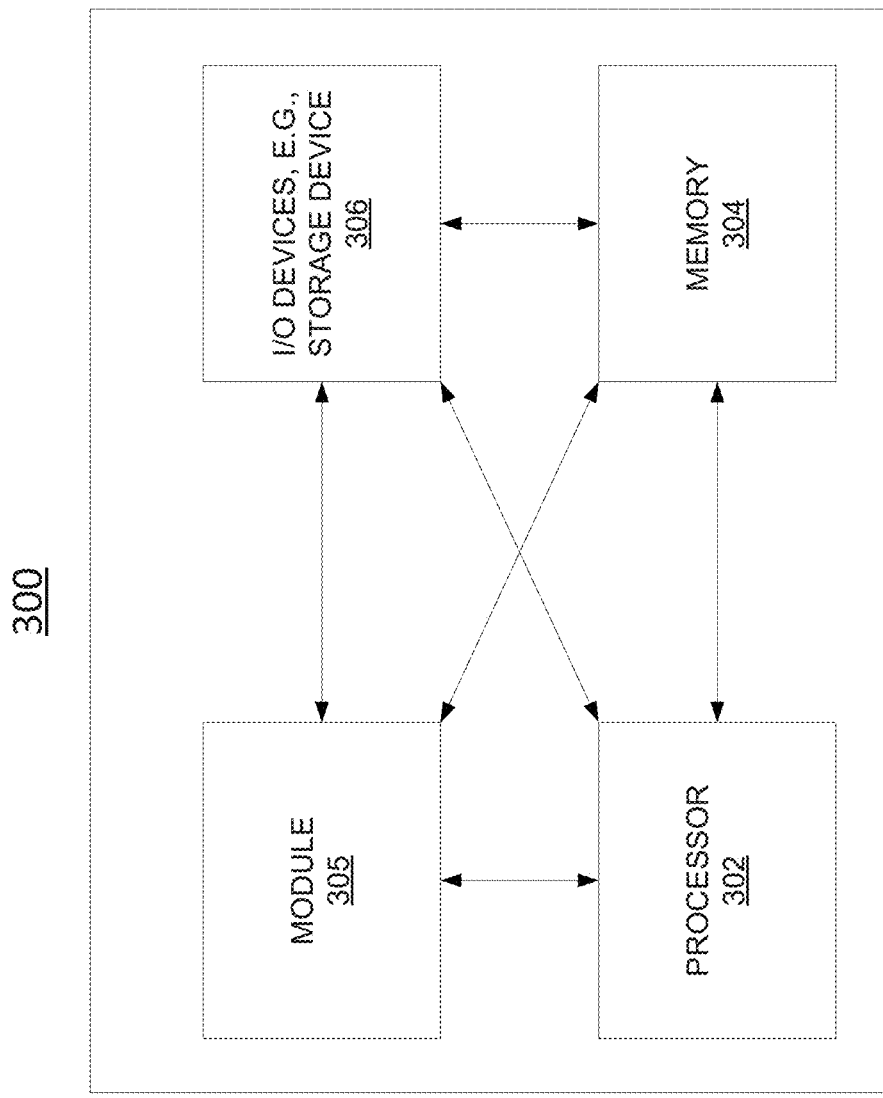
FIG. 3 illustrates a high-level block diagram of a computing device specially programmed to perform the functions described herein.

In one example, the server(s) 125 may comprise a computing system, or systems, such as one or more instances of computing system 300 depicted in FIG. 3, and may be configured to provide one or more functions for identifying and instructing at least one light source to provide illumination of at least one dark zone in accordance with at least one lighting feature that is determined based on a user profile, in accordance with the present disclosure. For example, server(s) 125 may be configured to perform one or more steps, functions, or operations in connection with the example method 200 described below. In addition, it should be noted that as used herein, the terms "configure," and "reconfigure" may refer to programming or loading a processing system with computer-readable/computer-executable instructions, code, and/or programs, e.g., in a distributed or non-distributed memory, which when executed by a processor, or processors, of the processing system within a same device or within distributed devices, may cause the processing system to perform various functions. Such terms may also encompass providing variables, data values, tables, objects, or other data structures or the like which may cause a processing system executing computer-readable instructions, code, and/or programs to function differently depending upon the values of the variables or other data structures that are provided. As referred to herein a "processing system" may comprise a computing device including one or more processors, or cores (e.g., as illustrated in FIG. 3 and discussed below) or multiple computing devices collectively configured to perform various steps, functions, and/or operations in accordance with the present disclosure.

In one example, DB(s) 126 may comprise one or more physical storage devices integrated with server(s) 125 (e.g., database servers), attached or coupled to the server(s) 125, or otherwise accessible to the server(s) 125 to store various types of information in support of a collaborative lighting system, in accordance with the present disclosure. For example, DB(s) 126 may include a lighting database to store lighting profiles of light sources 181-185, AAV 160, and other light sources. For instance, for each of the light sources 181-185 and AAV 160 such a lighting database may include a respective light source profile storing: an indication of the availability of the light source for collaborative lighting, a unique ID of the light source, and other values indicating the capabilities of the light source, such as the current intensity, color and/or temperature, coverage area, etc., the range of intensities available, the color(s) and/or temperature(s) available, and the range of potential coverage area of the light source, and so forth. With respect to AAV 160, the lighting database may further include an indication of the anticipated duration of time for which AAV 160 may be available within the area 120.

DB(s) 126 may also include, a camera/sensor database with a camera/sensor profile for each camera or other sensors, such as cameras 191-194, and camera 162 of AAV 160. For instance, a camera profile may include a camera location, orientation, field-of-view (e.g., viewport size), resolution, range, etc., as well as the maximum ranges/values for any or all of such features which may be adjustable/configurable for a particular camera. It should be noted that cameras 194 and 162 may be registered as transient cameras, and that the profiles for these cameras may include additional information, such as the speed and direction of movement, a current location, the type of vehicle 140 in which camera 194 is deployed (e.g., a surface-operating autonomous or non-autonomous vehicle), and similarly for camera 162 and AAV 160, a duration of time for which the respective camera is anticipated to be available to server(s) 125 while within area 120, and so forth.

In addition, DB(s) 126 may include a user profile database to store user profiles, such as for user 171 and other users. For instance, a user profile for user 171 may include a name, user name, device identifiers (e.g., identifying mobile device 141 and/or biometric sensor 172), as well as one or more user preferences for lighting features. For instance, a user preference may be for a particular brightness/intensity, one or more particular colors (and/or colors to be avoided), spatial features for which illumination should/should not be applied (e.g., dark alleys vs. open areas, being in a home neighborhood vs. an unfamiliar area, distances from the user for which dark areas should be illuminated, etc.), preferences for lighting features based on contextual factors (e.g., different brightness preferences for a nighttime stroll versus exercising, which may be determined from biometric data of the user, from an exercise application (app) installed on mobile device 141 or biometric sensor 172, etc.), and so forth. User preferences may also include preferences for light patterns, e.g., a blinking pattern, a beam sweep pattern and/or a change in beam width pattern, and so on.

In one example, the system 100 includes a telecommunication network 110. In one example, telecommunication network 110 may comprise a core network, a backbone network or transport network, such as an Internet Protocol (IP)/multi-protocol label switching (MPLS) network, where label switched routes (LSRs) can be assigned for routing Transmission Control Protocol (TCP)/IP packets, User Datagram Protocol (UDP)/IP packets, and other types of protocol data units (PDUs), and so forth. It should be noted that an IP network is broadly defined as a network that uses Internet Protocol to exchange data packets. However, it will be appreciated that the present disclosure is equally applicable to other types of data units and transport protocols, such as Frame Relay, and Asynchronous Transfer Mode (ATM). In one example, the telecommunication network 110 uses a network function virtualization infrastructure (NFVI), e.g., host devices or servers that are available as host devices to host virtual machines comprising virtual network functions (VNFs). In other words, at least a portion of the telecommunication network 110 may incorporate software-defined network (SDN) components.

As shown in FIG. 1, telecommunication network 110 may also include one or more servers 112. In one example, the server(s) 112 may each comprise a computing system, such as computing system 300 depicted in FIG. 3, and may be individually or collectively configured to provide one or more functions for identifying and instructing at least one light source to provide illumination of at least one dark zone in accordance with at least one lighting feature that is determined based on a user profile, such as described in connection with the example method 200 below. For instance, server(s) 112 may provide the same or similar functions as described in connection with server(s) 125. For instance, telecommunication network 110 may provide a collaborative lighting service as described herein, e.g., in addition to voice, data, television and other telecommunication services. For ease of illustration, various additional elements of telecommunication network 110 are omitted from FIG. 1.

In one example, wireless access network 115 comprises a radio access network implementing such technologies as: global system for mobile communication (GSM), e.g., a base station subsystem (BSS), or IS-95, a universal mobile telecommunications system (UMTS) network employing wideband code division multiple access (WCDMA), or a CDMA3000 network, among others. In other words, wireless access network 115 may comprise an access network in accordance with any "second generation" (2G), "third generation" (3G), "fourth generation" (4G), Long Term Evolution (LTE), "fifth generation" (5G), or any other existing or yet to be developed future wireless/cellular network technology. While the present disclosure is not limited to any particular type of wireless access network, in the illustrative example, wireless access network 115 is shown as a UMTS terrestrial radio access network (UTRAN) subsystem. Thus, base station 117 may comprise a Node B, an evolved Node B (eNodeB), a gNodeB (or gNB), etc. As illustrated in FIG. 1, mobile device 141 may be in communication with base station 117, which provides connectivity between mobile device 141 and other endpoint devices within the system 100, various network-based devices, such as server 112, and so forth. In addition, in one example biometric sensor 172, vehicle 140, and AAV 160 may also be in communication with base station 117, e.g., where these components may also be equipped for cellular communication. In one example, wireless access network 115 may be operated by the same or a different service provider that is operating telecommunication network 110.

In one example, vehicle 140 may be equipped with an associated on-board unit (OBU) (e.g., a computing device and/or processing system) for communicating with server(s) 125, either via the wireless access network 115 (e.g., via base station 117), via wireless access point 150), or both. For example, the OBU may include a global positioning system (GPS) navigation unit that enables the driver to input a destination, and which determines the current location, calculates one or more routes to the destination, and assists the driver in navigating a selected route. In one example, vehicle 140 may comprise an autonomous or semi-autonomous vehicle which may handle various vehicular operations, such as braking, accelerating, slowing for traffic lights, changing lanes, etc. For instance, vehicle 140 may include a LiDAR system (which may be part of the camera 194 or a separate unit), a GPS unit, and so forth which may be configured to enable vehicle 140 to travel to a destination with little to no human control.

In one example, mobile device 141 may comprise any subscriber/customer endpoint device configured for wireless communication such as a laptop computer, a Wi-Fi device, a Personal Digital Assistant (PDA), a mobile phone, a smartphone, an email device, a computing tablet, a messaging device, and the like. In one example, mobile device 141 may have both cellular and non-cellular access capabilities. Thus, mobile device 141 may be in communication with server(s) 125 via a wireless connection to base station 117 and/or to access point 150. For instance, mobile device 141 may include one or more transceivers for cellular based communications, IEEE 802.11 based communications, IEEE 802.15 based communications, and so forth. In one example, mobile device 141 may be associated with user 171. Similarly, biometric sensor 172, e.g., a wearable device, may capture biometric data of user 171 and may transmit the biometric data to server 112 via a wireless connection to base station 117 and/or to access point 150. The biometric sensor 172 may comprise, for example, a smartwatch and/or one or more of: a heart rate monitor, an electrocardiogram device, a galvanic skin response (GSR) device, and so forth. For example, the biometric sensor 172 may measure or capture data regarding various physical parameters of user 171 (broadly, "biometric data"). For instance, the biometric sensor 172 may record the user's heart rate, breathing rate, skin conductance and/or sweat/skin moisture levels, temperature, blood pressure, voice pitch and tone, body movements, e.g., eye movements, hand movements, and so forth. In one example, biometric sensor 172 may include a GPS unit, and may determine and provide location data to server(s) 125.

In one example, biometric sensor 172 may not be equipped for cellular communications. However, biometric data of user 171 captured via biometric sensor 172 may still be conveyed to server(s) 125 via wireless access network 115, telecommunication network 110, etc. by mobile device 141. For instance, biometric sensor 172 may have a wired or wireless connection (e.g., an IEEE 802.15 connection) to mobile device 141. In addition, mobile device 141 may be configured to forward the biometric data to server 112 using cellular communications via base station 117 and wireless access network 115. In still another example, biometric sensor 172 may alternatively or additionally comprise a radio frequency identification (RFID) tag that may be sensed by various devices in area 120 (such as AP 150, RFID beacons (not shown), etc.) and which may indicate a location of user 171.

In a first illustrative example, server(s) 125 may gather contextual information from various sources to determine a lighting need for user 171. For instance, user 171 may register for a collaborative lighting service either specifically with server(s) 125 or with a collaborative lighting service that includes server(s) 125 for area 120. As noted above, server(s) 125 may store information regarding user 171 in a user profile in a user database of DB(s) 126. In one example, server(s) 125 may detect the user 171 within or approaching the area 120. For instance, server(s) 125 may obtain position/location information of mobile device 141 and/or biometric sensor 172 (which is indicative of the position/location of user 171). In one example, server(s) 125 may also obtain orientation information of user 171, such as a direction the user 171 is facing, walking, riding, or otherwise travelling, etc. For instance, mobile device 141 and/or biometric sensor 172 may include a gyroscope, compass, altimeter, and other sensors from which the relevant data may be gathered and provided to server(s) 125. In one example, server(s) 125 may also obtain route information of user 171 from mobile device 141 (e.g., from a GPS unit being used for navigating a planned route).

Server(s) 125 may additionally determine one or more dark zones within the area 120 that may be relevant to the user 171 (e.g., a dark zone in the direction the user is walking or facing, a dark zone along a planned route of the user 171, etc.). As illustrated in FIG. 1, there are three dark zones 131-133 in the area 120. In one example, the dark zones 131-133 may be identified from visual and/or spatial data obtained within the area 120, e.g., from cameras 191-194 and/or camera 162. For example, cameras 191-194 may capture images and/or video of the area 120 within each respective field-of-view (FOV) 1-4 (and similarly for the camera 162 of AAV 160). In one example, visual and/or spatial data may also be obtained from mobile device 141, e.g., from an integrated camera of device 141. For instance, in an example in which mobile device 141 may comprise an augmented reality headset, visual and/or spatial data may be obtained from an outward facing camera.

In one example, server(s) 125 may generate (e.g., train) and store one or more detection models that may be used by server(s) 125, cameras 191-194, and/or camera 162 (or an on-board processing system of AAV 160) in order to detect dark zones in images and/or video. For example, a machine learning model (MLM) may be trained to detect and distinguish between dark zones/areas and non-dark zones. The MLM(s), or signature(s), may be specific to a particular type, or types of visual/image and/or spatial sensor data, or may take multiple types of sensor data as inputs. For instance, with respect to images or video, the input sensor data may include low-level invariant image data, such as colors (e.g., RGB (red-green-blue) or CYM (cyan-yellow-magenta) raw data (luminance values) from a CCD/photosensor array), shapes, color moments, color histograms, edge distribution histograms, etc. Visual features may also relate to movement in a video and may include changes within images and between images in a sequence (e.g., video frames or a sequence of still image shots), such as color histogram differences or a change in color distribution, edge change ratios, standard deviation of pixel intensities, contrast, average brightness, and the like. For instance, these features could be used to help quantify and distinguish a dark zone from a non-dark zone (e.g., a region in space may be temporarily darker than an adjacent region when a car headlight temporarily illuminates the adjacent region). However, for most of the time, the adjacent region may actually be darker.

In one example, MLM(s), or signature(s), may take multiple types of sensor data as inputs. For instance, MLM(s) or signature(s) may also be provided for detecting particular items based upon LiDAR input data, infrared camera input data, and so on. In accordance with the present disclosure, a detection model may comprise a machine learning model (MLM) that is trained based upon the plurality of features available to the system (e.g., a "feature space"). For instance, one or more positive examples for a feature may be applied to a machine learning algorithm (MLA) to generate the signature (e.g., a MLM). In one example, the MLM may comprise the average features representing the positive examples for an item in a feature space (e.g., a dark zone). Alternatively, or in addition, one or more negative examples may also be applied to the MLA to train the MLM. The machine learning algorithm or the machine learning model trained via the MLA may comprise, for example, a deep learning neural network, or deep neural network (DNN), a generative adversarial network (GAN), a support vector machine (SVM), e.g., a binary, non-binary, or multi-class classifier, a linear or non-linear classifier, and so forth. In one example, the MLA may incorporate an exponential smoothing algorithm (such as double exponential smoothing, triple exponential smoothing, e.g., Holt-Winters smoothing, and so forth), reinforcement learning (e.g., using positive and negative examples after deployment as a MLM), and so forth. It should be noted that various other types of MLAs and/or MLMs may be implemented in examples of the present disclosure, such as k-means clustering and/or k-nearest neighbor (KNN) predictive models, support vector machine (SVM)-based classifiers, e.g., a binary classifier and/or a linear binary classifier, a multi-class classifier, a kernel-based SVM, etc., a distance-based classifier, e.g., a Euclidean distance-based classifier, or the like, and so on. In one example, a trained detection model may be configured to process those features which are determined to be the most distinguishing features of the associated item/object or concept, e.g., those features which are quantitatively the most different from what is considered statistically normal or average from other items/objects or concepts that may be detected via a same system, e.g., the top 20 features, the top 50 features, etc. In one example, a detection model for a dark zone may comprise an image processing algorithm that identifies a dark zone according to defined criteria, such as a contiguous block of pixels or voxels having brightness/luminance values below a threshold and/or having a threshold difference in brightness/luminance with surrounding pixels or voxels, and so forth.

In one example, one or more detection models may be trained and/or deployed by server(s) 125 to process images, videos, and/or LiDAR data to identify patterns in the features of the sensor data that match the detection model(s), e.g., for dark zones and/or non-dark zones. In one example, a match may be determined using any of the visual features mentioned above, e.g., and further depending upon the weights, coefficients, etc. of the particular type of MLM. For instance, a match may be determined when there is a threshold measure of similarity among the features of the video or other data streams(s) and a signature for a dark zone or non-dark zone. In one example, server(s) 125 may identify the locations of dark zones, the dark zone boundaries, and/or other spatial features based upon the known locations of cameras 191-194, orientations and FOVs 1-4 of cameras 191-194, respectively, and so forth, and similarly for camera 162 of AAV 160 (e.g., as contained in a camera/sensor database of DB(s) 126). In one example, one or more detection models may also be loaded to one or more of the cameras 191-194, camera 162 and/or AAV 160, which may independently identify one or more dark zones, and which may notify server(s) 125 of any dark zones that are so detected.

In one example, cameras 191-194, camera 162 and/or AAV 160, may identify the bounds of any dark zones that are detected, e.g., by three-dimensional coordinates, by a center coordinate and range value(s) (e.g., distances and bearings to a boundary of the dark space in various directions), or other relative positional markers to identify where a dark zone exists in space. Alternatively, or in addition, server(s) 125 may obtain images and/or video from cameras 191-194 and/or camera 162, and may similarly identify the locations and bounds of any dark zones in area 120. In addition, in one example, server(s) 125 may combine spatial information regarding dark zones based upon data collected from multiple cameras 191-194 and/or camera 162. For instance, server(s) 125 may more accurately calculate the bounds of a dark area based upon visual and/or spatial data from multiple vantage points. For instance, where visual data from two of the cameras 191-194 and/or camera 162 are in agreement that a point in space of the area 120 has a particular brightness/luminance value (or the measured/detected values are close, e.g., within a threshold difference), or more simply agree that a particular point is or is not within a dark zone, the server(s) 125 may more confidently determine the dark zone boundaries. For instance, one camera may have a better view of one portion of a dark zone, while another camera may have a better view of a different portion of the dark zone. In another example, the bounds of a dark zone are not necessarily determined, but rather a dark zone may be identified by a center/centroid of a determined region of space.

In the present example, server(s) 125 may identify dark zones 131-133, and in one example, the respective bounds. Server(s) 125 may next determine the lighting features, if any, that should be applied to the dark zone(s) in accordance with a user profile of user 171. For example, user 171 may be walking towards dark zone 133, which, as illustrated in FIG. 1, may comprise a wooded area. In the present example, the dark zones 131 and 132 may be deemed not relevant to user 171. For instance, server(s) 125 may be aware of an intended path of user 171 based upon an intended destination and navigation directions from a GPS unit of mobile device 141. Alternatively, or in addition, server(s) 125 may determine that user 171 is not facing the direction(s) of dark zones 131 and 132. As such, only dark zone 133 is considered.

As indicated above, the user profile of user 171 may include one or more lighting preferences. For example, user 171 may prefer dark zones to be illuminated in a particular color, if available, may prefer dark zones that are within a certain distance of user 171 to be illuminated (e.g., while other dark zones that may be further away can be ignored), etc. In one example, if user 171 is going for a leisurely walk in a home neighborhood, the user may prefer a softer lighting, whereas if the user 171 is travelling and is walking in an unfamiliar area, user 171 may prefer brighter lighting, lighting over a wider area, etc., wherein these preferences may also be stored in the user profile of user 171. In this regard, server(s) 125 may access the user profile and may determine which from among one or more lighting preferences may be applicable based upon additional context data. For instance, user 171 may indicate that user 171 is on a fitness walk via a pedometer application (app) of mobile device 141 or biometric sensor 172. In addition, the server(s) 125 may determine that area 120 is the home neighborhood of user 171. As such, the user preference for softer lighting may be utilized by server(s) 125 (e.g., instead of a preference for brighter lighting in an unfamiliar neighborhood).

Continuing with the present example, server(s) 125 may next identify one or more light sources in area 120 that may be available to provide illumination to dark zone 133, and which meet any additional criteria in accordance with the user preference(s) of user 171. For instance, light sources 181-184 may be too far away to provide useful lighting to the dark zone 133. However, light source 185 may be within range. In addition, light source 185 may be controllable to select a softer (e.g., less bright) level of light in accordance with the user preference. In one example, light source 185 may further be controllable to provide directional light, e.g., a beam with spread of 120 degrees or less, 70 degrees or less, etc., in the direction of dark zone 133. In the example of FIG. 1, AAV 160 may additionally be identified as a potential light source that can illuminate dark zone 133 for user 171 in accordance with the user preferences. For instance, AAV 160 may reach a position to illuminate dark zone 133 within a time that is useful to user 171, e.g., before user 171 more closely approaches or enters the dark area, and may possess other capabilities, such as a lighting color and/or intensity range that complies with the user's preferences. In one example, server(s) 125 may select light source 185 to illuminate dark zone 133. For instance, server(s) 125 may be configured to select fixed-location light sources over mobile light sources, when available. In another example, light source 185 may be capable of illuminating less than all of dark zone 133. Accordingly, server(s) 125 may select both light source 185 and AAV 160 to illuminate dark zone 133.

In this regard, server(s) 125 may send one or more instructions to light source 185, AAV 160, or both to provide illumination to dark zone 133. In one example, the instruction(s) may include settings, or parameters to apply in accordance with the user preference(s) and the location and/or bounds of the dark zone 133 (e.g., a light color or temperature, an intensity/brightness, a directionality, etc.). In one example, light source 185 and/or AAV 160 are not necessarily provided with information regarding the location or bounds of dark zone 133. Rather, the instructions may simply direct the light source(s) as to all of the lighting features, or settings/parameters for directing light from a particular location. In another example, the location and/or bounds of dark zone 133 may be provided to light source 185 and/or AAV 160, where the light source(s) may determine how to coordinate and/or orient themselves in order to provide light to dark zone 133. For instance, light source 185 may independently determine how to orient a light beam 188 in the direction of dark zone 133. In one example, different portions of dark zone 133 may be identified for light source 185 and AAV 160, respectively. In any case, light source 185 and/or AAV 160 may generate (and direct) light to illuminate dark zone 133 in accordance with the instruction(s). In one example, a duration of time for which light is to be provided may be included in the instruction(s). Alternatively, or in addition, server(s) 125 may indicate a maximum amount of time, but may send further instructions to light source 185 and/or AAV 160 when the temporary illumination/lighting of dark zone 133 for user 171 may be ended.

As also noted above, server(s) 125 may record light source 185 and/or AAV 160 as unavailable for additional service while assigned to provide illumination/lighting to dark zone 133 for user 171. When this need has passed, server(s) 125 may update records in the lighting database to indicate that these light sources are again available for selection for other users (or for user 171 at a later time, etc.). It should again be noted that the light sources, such as light source 185 may be deployed for a primary purpose that is entirely different from the presently described collaborative lighting service. For instance, light source 185 may be deployed by a homeowner on a property as a motion-activated garage light. However, the homeowner may be away, asleep, or otherwise have no current need for light source 185. Nevertheless, the capabilities of the light source 185 may be such that the light source 185 can provide useful illumination at least as far away as dark zone 133. In addition, the homeowner may have granted permission for this use by server(s) 125 (e.g., in exchange for a fee, in exchange for allowing the homeowner to also be a user of the collaborative lighting service, etc.). As such, light source 185 may be selected by server(s) 125 at any time that it is not in use for its primary purpose as deployed by the homeowner, for instance.

In a second example as illustrated in FIG. 1, vehicle 140 may be driving through the area 120 and may be equipped with camera 194, which in one example, may further include a LIDAR capability or separate LiDAR unit. The vehicle 140 may be associated with a user 173, e.g., an owner and/or driver of the vehicle 140, who may be registered in a user database of DB(s) 126 and have an associated set of one or more user preferences stored in a user profile. In one example, dark zones 131 and 132 may specifically be detected via the visual and/or spatial data from camera 194 (e.g., by camera 194, vehicle 140, and/or server(s) 125, which may receive visual and/or spatial data of camera 194 from vehicle 140, and which may analyze such data server-side). In one example, dark zones 131 and 132 may further be detected in accordance with data from cameras 192 and 193 in the same or similar manner as described above. In addition, data from multiple cameras may be correlated to better delineate the bound of the dark zones 131 and 132.

Server(s) 125 may then determine whether to apply illumination, and if so, the lighting features thereof, to either or both of dark zones 131 and 132 in accordance with the user preferences of user 173 as contained in the user profile. In the present example, server(s) 125 may also make such determinations based upon additional contextual data, such as a current location of vehicle 140, a speed and/or direction of vehicle 140, an intended navigation path of vehicle 140, and so forth. For instance, a preference of user 173 may be to illuminate areas that are close to the road and that include sharp corners. Thus, for example, dark zone 131 may be determined to be only partially within the FOV 4 of the camera 194. Alternatively, or in addition, the dark zone 131 may be determined to be sufficiently far back from the road such that dark zone 131 need not be illuminated (as per the preference of user 173 as indicated in the user profile). However, dark zone 132 may be determined to be (1) along the intended path, (2) close to the road, and (3) to include sharp corners. In one example, the third feature (e.g., sharp corners), may be determined in accordance with a detection model for detecting sharp corners and based on visual and/or spatial features from camera 194 and/or cameras 192, 193, etc. For instance, such a detection model may comprise a trained MLM of one of the forms noted above. Similarly, other detection models (e.g., MLMs) may be trained and deployed for detecting other contextual features from visual and/or spatial data, such as detection models for "wooded area," "urban sidewalk," "suburban sidewalk," "rural road," "alleyway," "train station platform," "bus stop," and so forth.

Continuing with the present example, server(s) 125 may then identify any light sources in area 120 that may be available to illuminate dark zone 132 in accordance with the preference(s) of user 173 (e.g., being in a position in which light can be directed to dark zone 132 or deployable to such a position, and possessing other capabilities to comply with the preference(s), such as a light color, brightness, etc.). In this case, light sources 184 and 185 may be identified as having such capabilities. In addition, AAV 160 may further be available and have other requisite capabilities, but may not have the ability to reach a position to illuminate dark zone 132 in time for vehicle 140 and user 173. For illustrative purposes, it may be further assumed that light source 185 may be further away from dark zone 132 as compared to light source 184, and that light source 185 may be needed later to illuminate dark zone 133 as the vehicle 140 may proceed further along the road. As such, server(s) 125 may select light source 184 and may further send one or more instructions to light source 184 to illuminate dark zone 132 (e.g., by providing a specific beam direction, intensity, color, etc., and/or by providing data regarding the location of dark zone 132 and/or its bounds, and so forth). As such, light source 184 may provide the illumination of dark zone 132 by adjusting its settings in response to the instruction(s), e.g., to provide a directional light beam 189.

It should also be noted that the system 100 has been simplified. In other words, the system 100 may be implemented in a different form than that illustrated in FIG. 1. For example, the system 100 may be expanded to include additional networks, and additional network elements (not shown) such as wireless transceivers and/or base stations, border elements, routers, switches, policy servers, security devices, gateways, a network operations center (NOC), a content distribution network (CDN) and the like, without altering the scope of the present disclosure. In addition, system 100 may be altered to omit various elements, substitute elements for devices that perform the same or similar functions and/or combine elements that are illustrated as separate devices.

As just one example, one or more operations described above with respect to server(s) 125 may alternatively or additionally be performed by server(s) 112, and vice versa. In addition, although server(s) 112 and server(s) 125 are illustrated in specific deployments in the example of FIG. 1, in other, further, and different examples, the same or similar functions may be distributed among multiple devices within the telecommunication network 110, wireless access network 115, and/or the system 100 in general that may collectively provide a collaborative lighting service. Additionally, devices that are illustrated and/or described as using one form of communication (such as a cellular or non-cellular wireless communications, wired communications, etc.) may alternatively or additionally utilize one or more other forms of communication. Thus, these and other modifications are all contemplated within the scope of the present disclosure.

Figure 2:
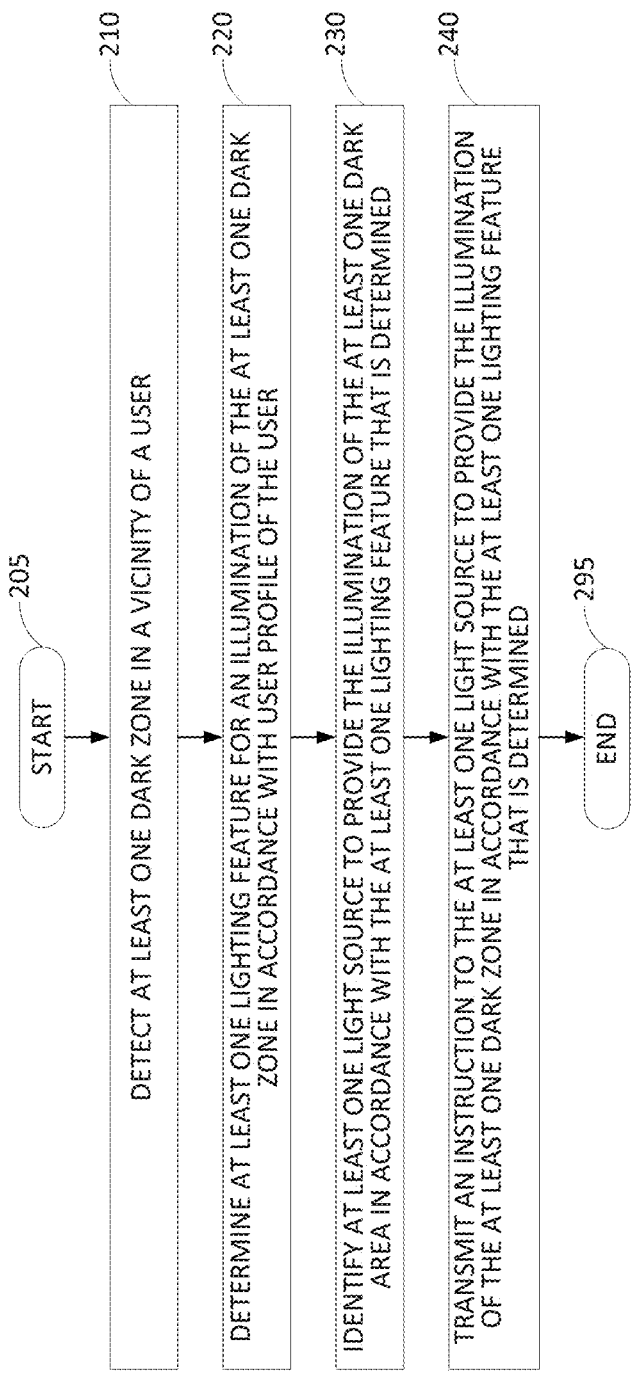
FIG. 2 illustrates a flowchart of an example method for identifying and instructing at least one light source to provide illumination of at least one dark zone in accordance with at least one lighting feature that is determined based on a user profile.

FIG. 2 illustrates a flowchart of an example method 200 for identifying and instructing at least one light source to provide illumination of at least one dark zone in accordance with at least one lighting feature that is determined based on a user profile. In one example, steps, functions and/or operations of the method 200 may be performed by a device as illustrated in FIG. 1, e.g., by one or more of server(s) 125 and/or server(s) 112, or any one or more components thereof, such as a processing system. Alternatively, or in addition, the steps, functions and/or operations of the method 200 may be performed by a processing system collectively comprising a plurality of devices as illustrated in FIG. 1, such as server(s) 125 and/or server(s) 112, cameras 191-193, light sources 181-185, and so forth. In one example, the steps, functions, or operations of method 200 may be performed by a computing device or processing system, such as computing system 300 and/or hardware processor element 302 as described in connection with FIG. 3 below. For instance, the computing system 300 may represent any one or more components of the system 100 that is/are configured to perform the steps, functions and/or operations of the method 200. Similarly, in one example, the steps, functions, or operations of the method 200 may be performed by a processing system comprising one or more computing devices collectively configured to perform various steps, functions, and/or operations of the method 200. For instance, multiple instances of the computing system 300 may collectively function as a processing system. For illustrative purposes, the method 200 is described in greater detail below in connection with an example performed by a processing system. The method 200 begins in step 205 and proceeds to step 210.

At step 210, the processing system detects at least one dark zone in a vicinity of a user. For instance, in one example, the at least one dark zone may be detected via at least one sensor that is distinct from the at least one light source. The vicinity of the user may be a defined range/distance, or may vary based upon a current or recent speed of movement of the user, for instance. In one example, the "vicinity" may be user-selected. For instance, different users may have different ranges for which they prefer collaborative lighting of dark zones to be active on their behalf. In one example, the at least one sensor may include a mobile sensor. For instance, the at least one sensor may be part of a mobile computing device of the user, a vehicle of the user, and so forth. For example, the at least one sensor may comprise at least one of a camera or a LIDAR unit. In one example, the detecting of the at least one dark zone may be via a detection model (e.g., a MLM) in accordance with input data from the at least one sensor. In one example, the at least one dark zone may be defined by one or more coordinate points in a space. For instance, this may be an integral capability of a LiDAR unit, or may alternatively or additionally be determined via intersection of two or more camera views if ranging is not available from an individual camera view.

In one example, step 210 may further include detecting additional features of the vicinity of the user from visual and/or spatial data from the one or more sensors. For instance, this may include distances of the dark zone(s) from the user, sharp corners, whether the area is wooded, suburban, or urban, whether there are other people or animals present, and so forth. This additional contextual data may be obtained from visual and/or spatial sensor data using one or more detection models specific to the corresponding items/objects, or other features. Alternatively, or in additional, some features, such as the presence of other users, may be detected in an aggregate and non-personally identifying way via determination of a number of mobile devices present in the area from sensing by a wireless access point, or the like. Similarly, whether the user is in a home neighborhood or an unfamiliar area, whether the user is strolling or exercising, whether the user has a particular destination, and so forth may be determined via additional data shared with the processing system by a mobile computing device of the user.

When the user is traveling in a car or other vehicles, additional data may include the current location, speed, and/or direction of movement of the vehicle, and so on.

At step 220, the processing system determines at least one lighting feature for an illumination of the at least one dark zone in accordance with a user profile of the user. In particular, the user profile may identify a preference for the at least one lighting feature for illuminating dark zones. The at least one lighting feature may comprise, for example, at least one of a light intensity, a light color, or a light directionality (e.g., direct vs. indirect lighting). The at least one lighting feature may also include a light pattern, such as an on/off pattern, an intensity variation pattern, a color-variation pattern, a beam direction variation pattern, and/or a beam spread variation pattern, etc. For instance, when a light pattern is personalized to the user, the user may better know which dark zone illuminations are being provided for the user's benefit (e.g., where multiple users may be in an area and dark zone illuminations are being provided for such multiple users). It should be noted that in one example, a beam pattern preference, as well as other lighting feature preferences, may have no specific purpose other than that the user likes or prefers such a setting, or is entertained by such a setting.

In one example, the determination of the at least one lighting feature may further be in accordance with additional contextual data such as noted above. For instance, the user preference for soft or bright illumination may vary depending upon the circumstances, such as whether other people or animals are present, and/or a number or density thereof, whether the user is in a home neighborhood or in an unfamiliar area (which may be explicitly indicated by input via a user device, or which may be learned by such a user device by observing the user's typical locations over time), a type of activity (e.g., an evening walk versus riding a bicycle at night, etc.), a size of a dark zone, a type of dark zone or features of the dark zone (e.g., for open spaces, the user may prefer no additional lighting or additional lighting of lesser intensity, but for alleyways, blind corners of buildings, etc. the user may prefer full illumination at high intensity).

At step 230, the processing system identifies at least one light source to provide the illumination of the at least one dark area in accordance with the at least one lighting feature that is determined. The at least one light source may comprise at least one of a fixed light source (installed at a location where the light source is intended to remain) or a mobile light source (e.g., a surface-based AV or an AAV). In one example, the at least one light source is in communication with the processing system via one or more networks (e.g., wired or wireless network(s)). In one example, step 230 may include determining that the at least one light source is configured to provide the lighting feature(s) in accordance with the user preference(s). For instance, each light source may have a profile in a lighting database that includes information regarding which lighting features the light source is capable of (e.g., in addition to location information, availability information, identifier(s), such as an IP address to enable communication with the light source over one or more networks, etc.). For example, the at least one light source may emit light of a particular color, or may be adjustable to emit light of a selected color (e.g., from among a color range, or a set of defined colors, such as for a light emitting diode (LED) light source). Similarly, in one example, the at least one light source may be adjustable to emit light with a beam in a selected direction. For instance, the at least one light source may be adjustable in azimuth and elevation to move a beam direction. Alternatively, or in addition, the at least one light source may be adjustable to emit light with the beam having a selected beam spread. In one example, the at least one light source may emit light of a particular intensity or may be adjustable to emit light of a selected intensity. In one example, the at least one light source may emit light of a particular temporal pattern or may be adjustable to emit light of a particular temporal pattern. For instance, as noted above, this can be an on/off pattern, intensity variation pattern, color-variation pattern, beam direction variation pattern, and/or beam spread variation pattern, etc.

At step 240, the processing system transmits an instruction to the at least one light source to provide the illumination of the at least one dark zone in accordance with the at least one lighting feature that is determined. For instance, the instruction may be sent via one or more wired or wireless networks. In the case of multiple light sources being selected, multiple instructions may be sent by the processing system. The light sources receiving such instructions may provide illumination of the one or more dark zones, where the illumination may provide the at least one lighting feature. For instance, the lighting source(s) may apply any configurations/parameters provided in the instruction(s), may calculate and implement some of the parameters based upon information defining the location(s) and/or bounds of the dark zone(s), and so on.

Following step 240, the method 200 proceeds to step 295. At step 295, the method 200 ends.

It should be noted that the method 200 may be expanded to include additional steps, or may be modified to replace steps with different steps, to combine steps, to omit steps, to perform steps in a different order, and so forth. For instance, in one example the processing system may repeat one or more steps of the method 200 for additional time periods, for additional locations of the user, for different trips, and so forth, for other users in the vicinity at the same time or at a different time as the user, and so on. In one example, the method 200 may be expanded to include step 210 including or being preceded by detecting the presence of the user, such as via a mobile computing device of the user, a vehicle of the user, etc. providing current location information to the processing system. In one example, this may alternatively or additionally include other forms of determining the user's location, such as via sensing an RFID tag of the user in an area, e.g., via one or more RFID readers, or beacons, via facial or other biometric detection (with permission of the user), and so forth. In still another example, the method 200 may be modified to include determining settings and/or lighting features for illuminating one or more dark areas based upon multiple user preferences (e.g., based on a consensus of user preferences, an average of preferences for each setting, a turn-based or least recently selected algorithm, etc.). In one example, the method 200 may be expanded to include a step of obtaining user feedback regarding a dark zone illumination and adjusting the lighting features for the current illumination of the dark zone, or for a next service on behalf of the user. For instance, a user may observe that a current intensity is too bright for the user's taste and may prefer a softer lighting in the future. Thus, the user may indicate a change in preference, such as by an input via a collaborative lighting app on the user's mobile device, which may be provided to the processing system to update the user profile.

In one example, the method 200 may be modified to comprise a deceptive lighting service. For example, a user may be driving home and does not want every street light in the neighborhood to announce that the user is approaching. In this case, the user preference(s) may be for activating lighting to illuminate darks zones that are over a certain distance away from the user. For instance, a neighbor's walkway lights may be activated to attract attention there while the user pulls into the user's own garage. In one example, lights may be dimmed or turned off in the vicinity of the user (to the extent that this does not interfere with the preferences of other users in the area, does not conflict with the primary purposes of the lights that may be so controlled, etc.). In various other examples, the method 200 may further include or may be modified to comprise aspects of any of the above-described examples in connection with FIG. 1, or as otherwise described in the present disclosure. Thus, these and other modifications are all contemplated within the scope of the present disclosure.

In addition, although not expressly specified above, one or more steps of the method 200 may include a storing, displaying and/or outputting step as required for a particular application. In other words, any data, records, fields, and/or intermediate results discussed in the method can be stored, displayed and/or outputted to another device as required for a particular application. Furthermore, operations, steps, or blocks in FIG. 2 that recite a determining operation or involve a decision do not necessarily require that both branches of the determining operation be practiced. In other words, one of the branches of the determining operation can be deemed as an optional step. However, the use of the term "optional step" is intended to only reflect different variations of a particular illustrative embodiment and is not intended to indicate that steps not labelled as optional steps to be deemed to be essential steps. Furthermore, operations, steps or blocks of the above described method(s) can be combined, separated, and/or performed in a different order from that described above, without departing from the example embodiments of the present disclosure.

FIG. 3 depicts a high-level block diagram of a computing device or processing system specifically programmed to perform the functions described herein. For example, any one or more components or devices illustrated in FIG. 1 or described in connection with the examples of FIG. 2 may be implemented as the processing system 300. As depicted in FIG. 3, the processing system 300 comprises one or more hardware processor elements 302 (e.g., a microprocessor, a central processing unit (CPU) and the like), a memory 304, (e.g., random access memory (RAM), read only memory (ROM), a disk drive, an optical drive, a magnetic drive, and/or a Universal Serial Bus (USB) drive), a module 305 for identifying and instructing at least one light source to provide illumination of at least one dark zone in accordance with at least one lighting feature that is determined based on a user profile, and various input/output devices 306, e.g., a camera, a video camera, storage devices, including but not limited to, a tape drive, a floppy drive, a hard disk drive or a compact disk drive, a receiver, a transmitter, a speaker, a display, a speech synthesizer, an output port, and a user input device (such as a keyboard, a keypad, a mouse, and the like).

Although only one processor element is shown, it should be noted that the computing device may employ a plurality of processor elements. Furthermore, although only one computing device is shown in the Figure, if the method(s) as discussed above is implemented in a distributed or parallel manner for a particular illustrative example, i.e., the steps of the above method(s) or the entire method(s) are implemented across multiple or parallel computing devices, e.g., a processing system, then the computing device of this Figure is intended to represent each of those multiple general-purpose computers. Furthermore, one or more hardware processors can be utilized in supporting a virtualized or shared computing environment. The virtualized computing environment may support one or more virtual machines representing computers, servers, or other computing devices. In such virtualized virtual machines, hardware components such as hardware processors and computer-readable storage devices may be virtualized or logically represented. The hardware processor 302 can also be configured or programmed to cause other devices to perform one or more operations as discussed above. In other words, the hardware processor 302 may serve the function of a central controller directing other devices to perform the one or more operations as discussed above.

It should be noted that the present disclosure can be implemented in software and/or in a combination of software and hardware, e.g., using application specific integrated circuits (ASIC), a programmable logic array (PLA), including a field-programmable gate array (FPGA), or a state machine deployed on a hardware device, a computing device, or any other hardware equivalents, e.g., computer readable instructions pertaining to the method(s) discussed above can be used to configure a hardware processor to perform the steps, functions and/or operations of the above disclosed method(s). In one example, instructions and data for the present module or process 305 for identifying and instructing at least one light source to provide illumination of at least one dark zone in accordance with at least one lighting feature that is determined based on a user profile (e.g., a software program comprising computer-executable instructions) can be loaded into memory 304 and executed by hardware processor element 302 to implement the steps, functions or operations as discussed above in connection with the example method(s). Furthermore, when a hardware processor executes instructions to perform "operations," this could include the hardware processor performing the operations directly and/or facilitating, directing, or cooperating with another hardware device or component (e.g., a co-processor and the like) to perform the operations.

The processor executing the computer readable or software instructions relating to the above described method(s) can be perceived as a programmed processor or a specialized processor. As such, the present module 305 for identifying and instructing at least one light source to provide illumination of at least one dark zone in accordance with at least one lighting feature that is determined based on a user profile (including associated data structures) of the present disclosure can be stored on a tangible or physical (broadly non-transitory) computer-readable storage device or medium, e.g., volatile memory, non-volatile memory, ROM memory, RAM memory, magnetic or optical drive, device or diskette and the like. Furthermore, a "tangible" computer-readable storage device or medium comprises a physical device, a hardware device, or a device that is discernible by the touch. More specifically, the computer-readable storage device may comprise any physical devices that provide the ability to store information such as data and/or instructions to be accessed by a processor or a computing device such as a computer or an application server.

While various embodiments have been described above, it should be understood that they have been presented by way of example only, and not limitation. Thus, the breadth and scope of a preferred embodiment should not be limited by any of the above-described example embodiments, but should be defined only in accordance with the following claims and their equivalents.

What is claimed is:

1. A method, comprising:
processing, by a system including at least one processor, image data acquired by a camera to determine a portion of an area as being inadequately illuminated;
identifying, by the system, a capability of a light source to illuminate at least that portion of the area, the light source being separate from the camera; and
based at least in part on (i) inadequate illumination of the area and (ii) the capability of the light source to illuminate at least the portion of the area, causing, by the system, the light source to illuminate at least the portion of the area.

2. The method of claim 1, wherein identifying the capability of the light source includes:
determining, by the system, that stored data for the light source indicates that the light source is capable of illuminating at least the portion of the area.

3. The method of claim 2, wherein the data is stored together with other data for one or more other light sources that are configured to be controlled by the system to selectively illuminate one or more other portions of the area.

4. The method of claim 2, wherein the data identifies one or more capabilities of the light source.

5. The method of claim 4, further comprising:
adjusting, by the system, a setting of the light source based on the one or more capabilities identified in the data.

6. The method of claim 5, wherein:
the one or more capabilities include a range of available intensities of the light source;
processing the image data includes determining, based on the image data, an illumination level for the portion of the area; and
adjusting the setting includes setting an intensity of the light source based at least in part on the range of available intensities and the determined illumination level for the portion of the area.

7. The method of claim 4, wherein:
the one or more capabilities include a coverage area of the light source; and
identifying the capability of the light source includes determining that the portion of the area is within the coverage area.

8. The method of claim 1, further comprising:
determining, by the system, that a person is present within the portion of the area;
wherein causing the light source to illuminate at least the portion of the area is further based at least in part on the person being present.

9. The method of claim 8, further comprising:
determining, by the system, a preference indicated in data for the person; and
adjusting, by the system, a setting of the light source based at least in part on the preference.

10. The method of claim 1, wherein the processing is performed by one or more processors of the camera.

11. A system, comprising:
one or more processors; and
one or more non-transitory computer-readable mediums encoded with instructions which, when executed by the one or more processors, cause the system to:
process image data acquired by a camera to determine a portion of an area as being inadequately illuminated;
identify a capability of a light source to illuminate at least that portion of the area, the light source being separate from the camera; and
based at least in part on (i) inadequate illumination of the area and (ii) the capability of the light source to illuminate at least the portion of the area, cause the light source to illuminate at least the portion of the area.

12. The system of claim 11, wherein the one or more non-transitory computer-readable mediums are further encoded with additional instructions which, when executed by the one or more processors, further cause the system to identify the capability of the light source at least in part by:
determining that stored data for the light source indicates that the light source is capable of illuminating at least the portion of the area.

13. The system of claim 12, wherein the data is stored together with other data for one or more other light sources that are configured to be controlled by the system to selectively illuminate one or more other portions of the area.

14. The system of claim 12, wherein the data identifies one or more capabilities of the light source.

15. The system of claim 14, wherein the one or more non-transitory computer-readable mediums are further encoded with additional instructions which, when executed by the one or more processors, further cause the system to:
adjust a setting of the light source based on the one or more capabilities identified in the data.

16. The system of claim 15, wherein the one or more capabilities include a range of available intensities of the light source, the one or more non-transitory computer-readable mediums are further encoded with additional instructions which, when executed by the one or more processors, further cause the system to:
process the image data at least in part by determining, based on the image data, an illumination level for the portion of the area; and
adjust the setting at least in part by setting an intensity of the light source based at least in part on the range of available intensities and the determined illumination level for the portion of the area.

17. The system of claim 14, wherein the one or more capabilities include a coverage area of the light source, and the one or more non-transitory computer-readable mediums are further encoded with additional instructions which, when executed by the one or more processors, further cause the system to:
identify the capability of the light source at least in part by determining that the portion of the area is within the coverage area.

18. The system of claim 11, wherein the one or more non-transitory computer-readable mediums are further encoded with additional instructions which, when executed by the one or more processors, further cause the system to:
determine that a person is present within the portion of the area; and
cause the light source to illuminate at least the portion of the area further based at least in part on the person being present.

19. The system of claim 18, wherein the one or more non-transitory computer-readable mediums are further encoded with additional instructions which, when executed by the one or more processors, further cause the system to:
determine a preference indicated in data for the person; and
adjust a setting of the light source based at least in part on the preference.

20. The system of claim 11, wherein the one or more processors are included in the camera.

\* \* \* \* \*